US007146201B2

(12) United States Patent
Lin

(10) Patent No.: US 7,146,201 B2
(45) Date of Patent: Dec. 5, 2006

(54) PORTABLE WIRELESS APPARATUS

(75) Inventor: Huei Lin, Tao Yuan Hsien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 582 days.

(21) Appl. No.: 10/730,679

(22) Filed: Dec. 8, 2003

(65) Prior Publication Data

US 2004/0224734 A1 Nov. 11, 2004

(30) Foreign Application Priority Data

Apr. 28, 2003 (TW) .............................. 92206726 U

(51) Int. Cl.
*H04B 1/38* (2006.01)
*H04M 1/00* (2006.01)

(52) U.S. Cl. ............................... 455/575.7; 455/575.5; 455/90.3; 455/556.1; 455/556.2; 455/343.3; 455/129; 343/702; 343/895; 343/700 MS

(58) Field of Classification Search ............... 455/90.3, 455/575.7, 575.5, 556.1, 556.2, 343.3, 129
See application file for complete search history.

(56) References Cited

U.S. PATENT DOCUMENTS 5,557,288 A * 9/1996 Kato et al. .................. 343/702
6,191,743 B1 * 2/2001 Jones et al. ................. 343/702
6,195,049 B1 * 2/2001 Kim et al. ........... 343/700 MS
6,222,505 B1 * 4/2001 Endo et al. .................. 343/895
6,400,931 B1 * 6/2002 Inkinen et al. ............. 455/90.1
6,781,546 B1 * 8/2004 Wang et al. ......... 343/700 MS
6,814,593 B1 * 11/2004 Wang et al. ................ 439/131

* cited by examiner

*Primary Examiner*—Marceau Milford
(74) *Attorney, Agent, or Firm*—Thomas, Kayden, Horstemeyer & Risley

(57) ABSTRACT

A portable wireless apparatus with transmission capability. An inner common antenna, including a metal frame embedded in an LCD and an inverse F-type antenna device, is provided, such that performance of the electromagnetic wave is increased to a maximum and resonance characteristics or mechanism of the antenna device is reduced, and the common antenna is adequately provided and embedded in the portable wireless apparatus.

20 Claims, 6 Drawing Sheets

PORTABLE WIRELESS APPARATUS

BACKGROUND OF THE INVENTION

1. Field of the Invention

The present invention relates to a portable wireless apparatus, and in particular to a portable wireless apparatus provided with an inner common antenna, having a metal frame embedded in an LCD and an inverse F-type antenna device.

2. Description of the Related Art

With the demands on electronic wireless products, such as Personal Digital Assistant (PDA), mobile phone, etc., for smaller volume, these products have to avoid electromagnetic interference with other electronic products. As well, antenna structures, disposed in the inner, limited space of the electronic wireless products, provide ideal gain while transmitting electromagnetic waves.

SUMMARY OF THE INVENTION

Accordingly, an object of the invention is to provide an inner common antenna for a portable wireless apparatus. For example, the common antenna is suitable for Bluetooth, WLAN802.11b and WLAN802.11g systems operated at 2.45 GHz. Performance of the electromagnetic wave is increased to a maximum by the metal frame. Resonance characteristics or mechanism of the antenna device is reduced, and the common antenna is adequately provided and embedded in the portable wireless apparatus.

The invention provides an inner common antenna having an inverse F-type antenna device and a metal frame embedded in an LCD, such that the volume of the portable wireless apparatus is reduced and gain of the electromagnetic wave is increased to a maximum.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
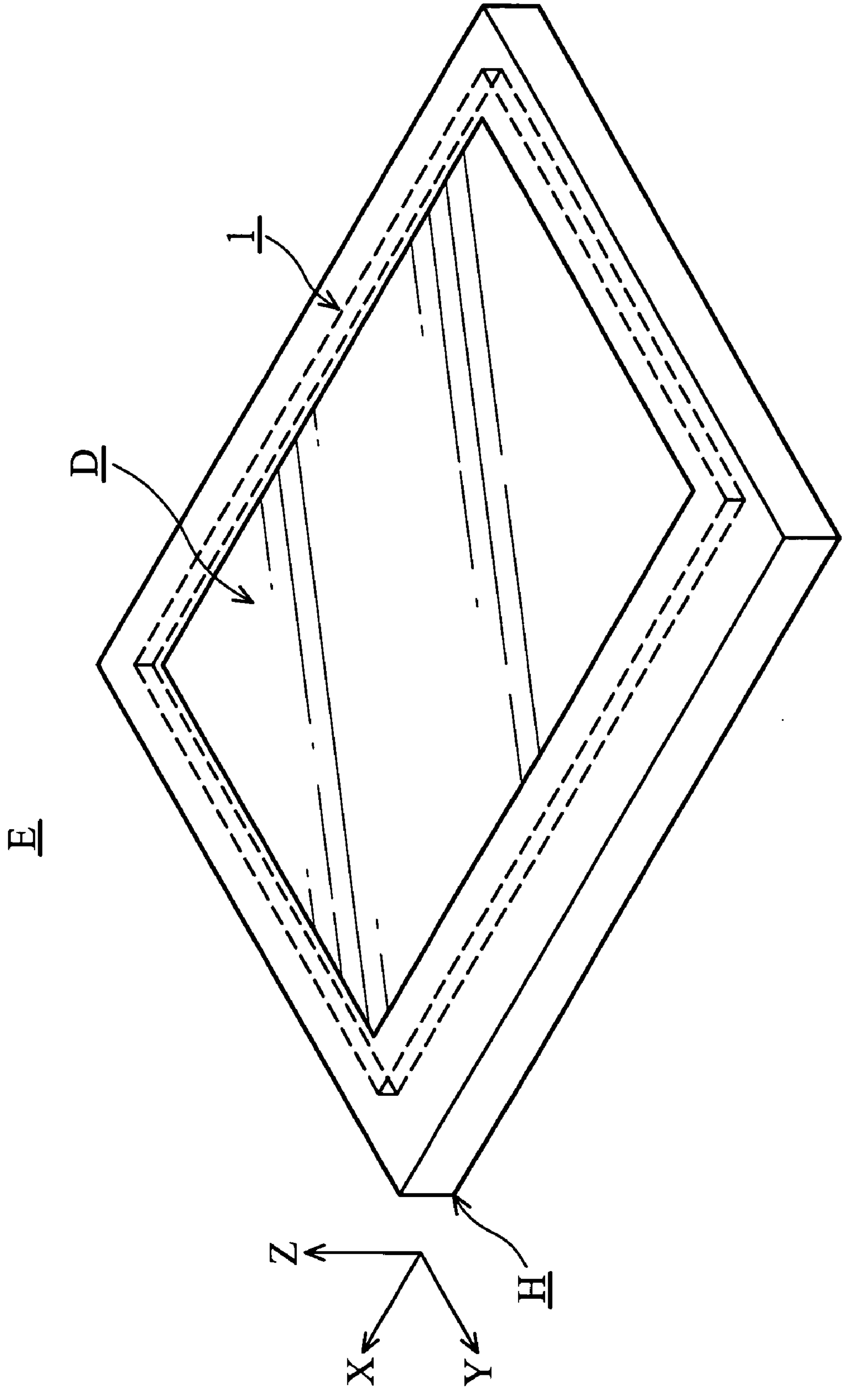
FIG. 1 is a perspective view of a portable wireless apparatus (E), wherein the portable wireless apparatus (E) has a housing (H), a frame (1) and a display unit (D)
Figure 2:
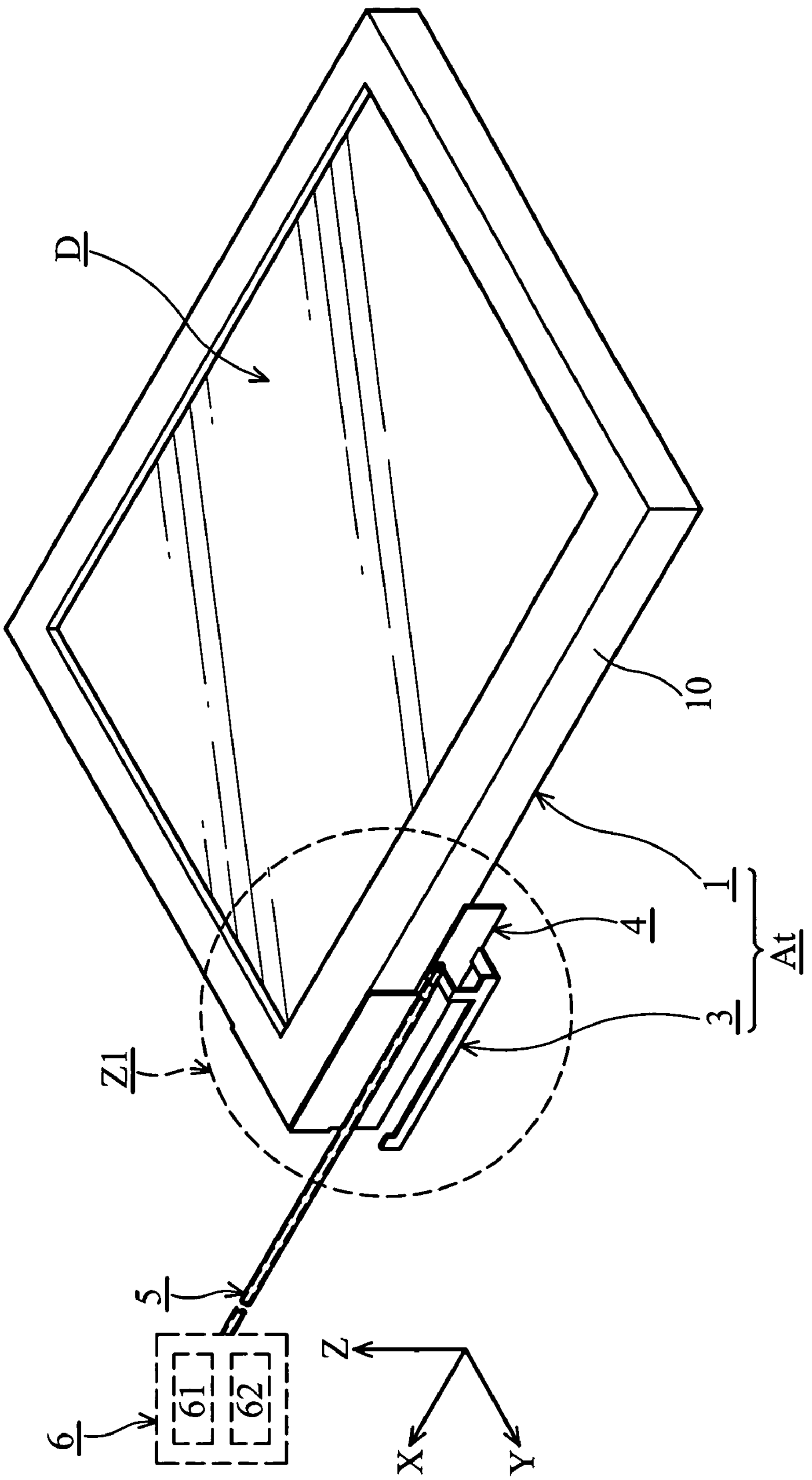
FIG. 2 is a perspective view of the portable wireless apparatus (E) in FIG. 1 without the housing (H), wherein the portable wireless apparatus (E) further provides an antenna device (3) defined by a reference coordinate system (X-Y-Z)

In FIGS. 1 and 2, a portable wireless apparatus E, such as Personal Digital Assistant (PDA), pocket PC, notebook PC, mobile phone, etc., has a housing H, a frame 1, a display unit D, an antenna device 3, a plate 4, a cable 5, and an adjustable device 6. In this preferred embodiment, the display unit D is a liquid crystal display (LCD), and the frame 1 and the plate 4 are made of metal or other conductive materials.

The housing H is a main part of the portable wireless apparatus E and the display unit D is disposed in the housing H through the frame 1, i.e., the frame 1 is a bezel embedded in the periphery of the display unit D. The plate 4 is disposed on a sidewall 10 of the frame 1 and electrically connected to the frame 1, and the antenna device 3 is a cantilever element protruding from the plate 4, such that the antenna device 3 is electrically connected to the frame 1. The adjustable device 6 has a modulator 61 and a demodulator 62, each of connected to the antenna device 3 through the cable 5. An inner common antenna At is formed by the frame 1 and the antenna device 3, such that a signal, such as carrier, is transmitted by the common antenna At. That is to say, the frame 1 acts as an extensive antenna of the portable wireless apparatus E. The plate 4 can also function as part of the common antenna At. As well, signals received by the common antenna At, are processed by the modulator 61 and the demodulator 62 of the adjustable device 6.

Figure 3:
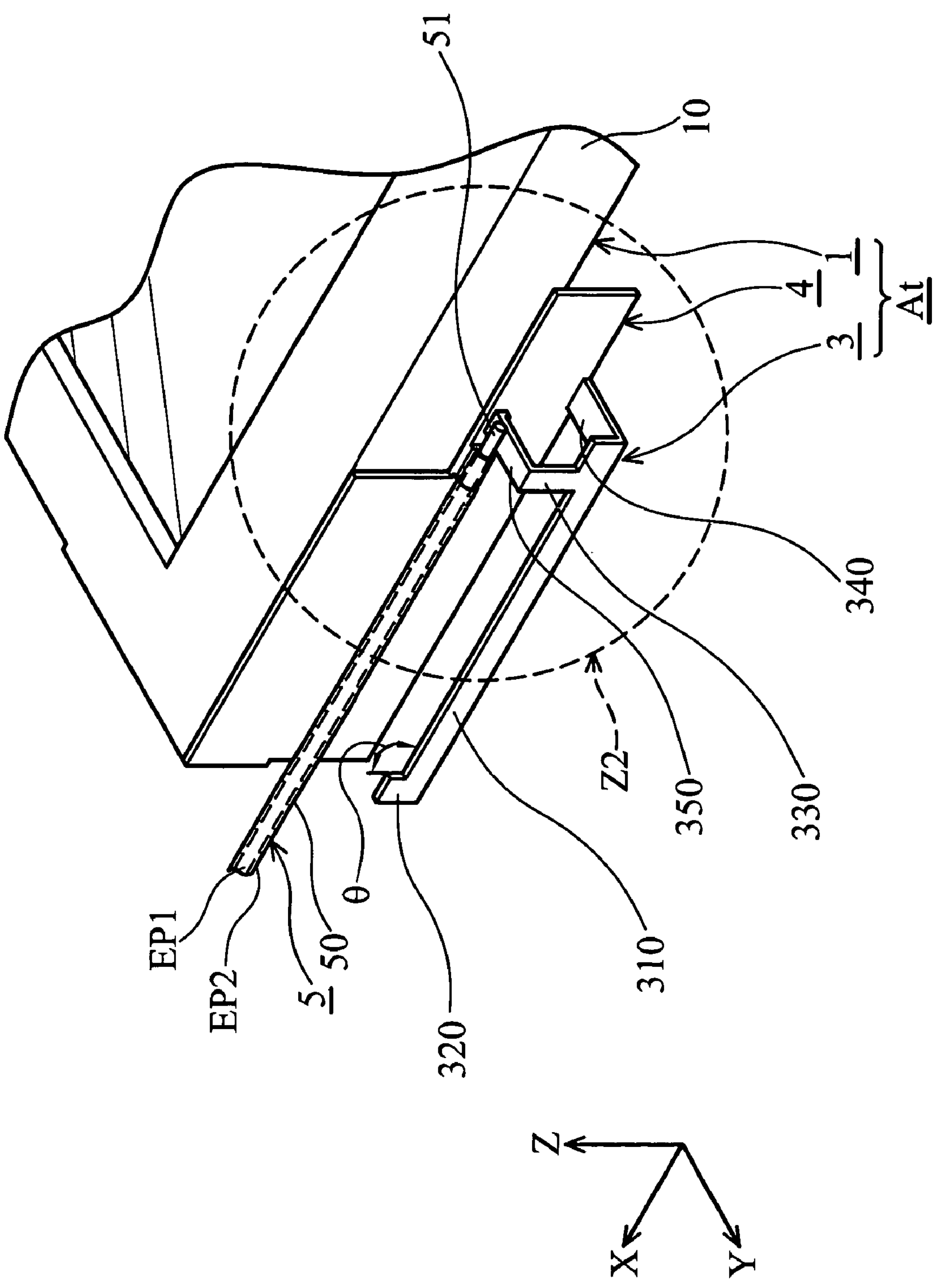
FIG. 3 is an enlarged perspective view along a dotted line (Z1) in FIG. 2.
Figure 4:
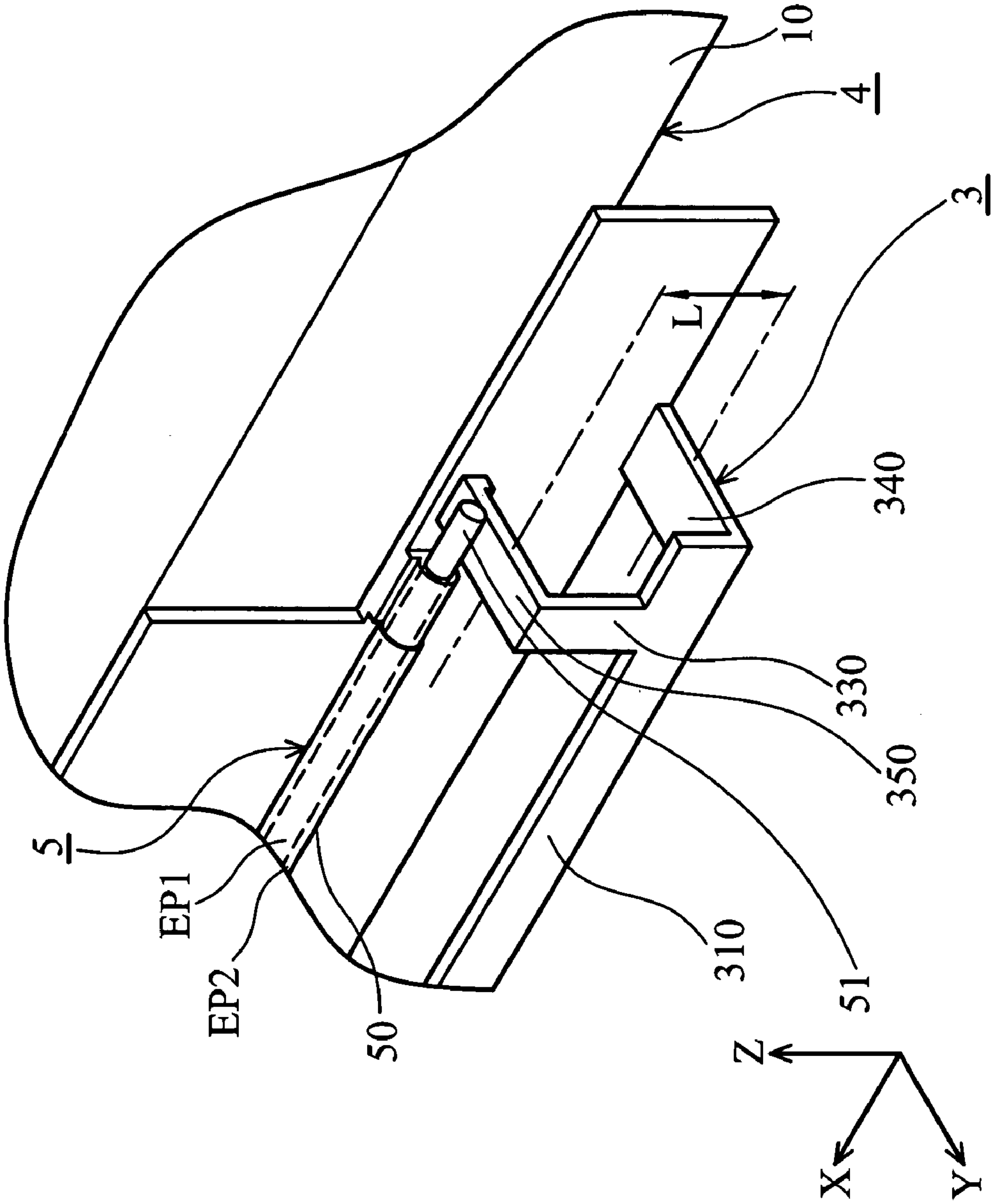
FIG. 4 is an enlarged perspective view along a dotted line (Z2) in FIG. 3.

In FIGS. 3 and 4, the cable 5 has a first conductive portion 50 and a second conductive portion 51. The cable 5 is a coaxial cable, and the first conductive portion 50 (cathode), is an outer conductor and the second conductive portion 51 (anode) is an inner conductor enclosed by the first conductive portion 50 and isolated from the first conductive portion 50. A first reference electric potential EP1 and a second reference electric potential EP2 are connected to the second conductive portion 51 and the first conductive portion 50, respectively. In this embodiment, the first reference electric potential EP1 is positive and connected to a signal source or RF circuit, and the second reference electric potential EP2 is negative and connected to a ground level. Thus, central frequency and return loss of the portable wireless apparatus E can be properly adjusted by the antenna device 3.

Figure 5:
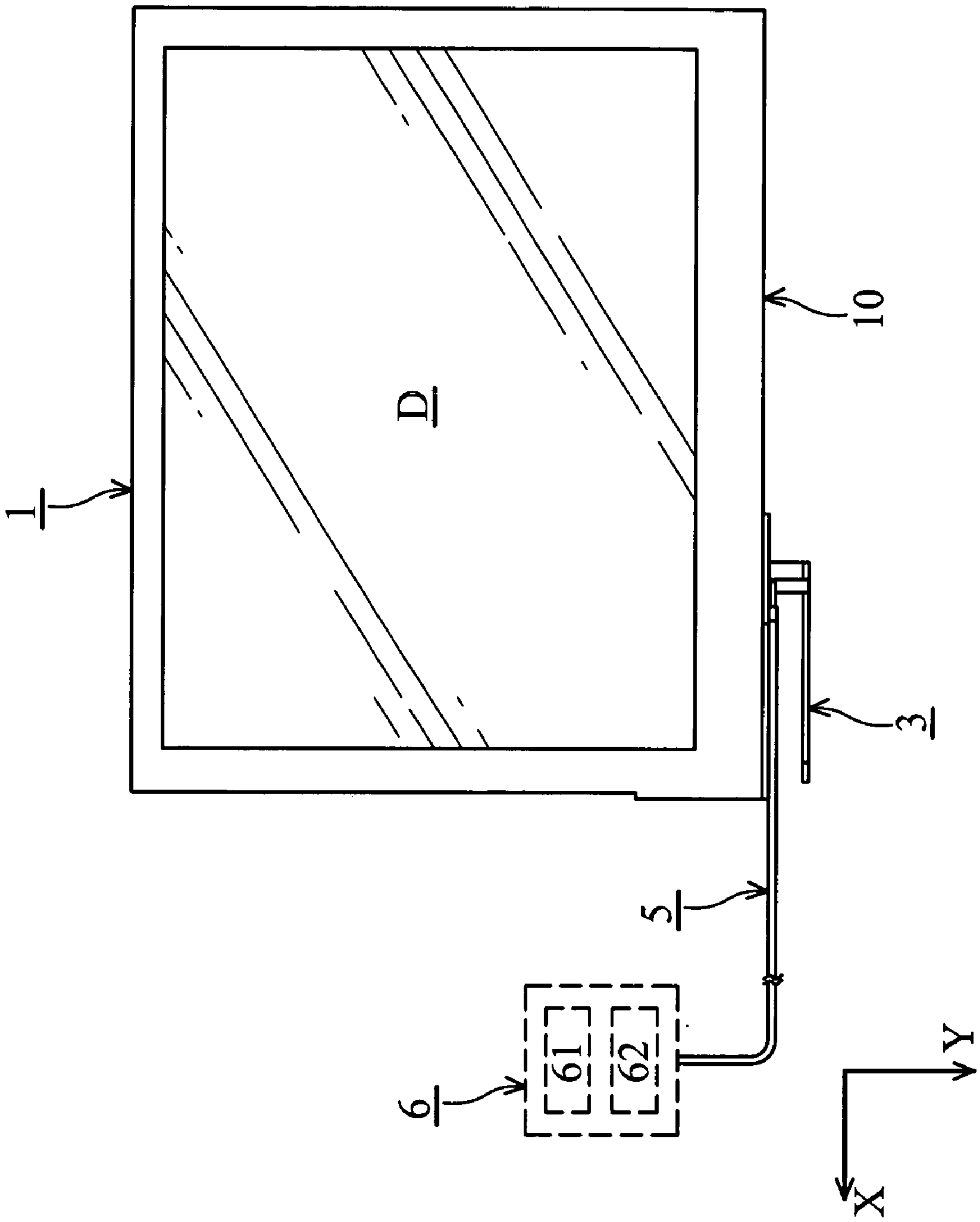
FIG. 5 is a plane view of the portable wireless apparatus (E) in FIG. 2.

In FIG. 5, a projection of the antenna device 3 on a reference plane XY is substantially shaped as an inverse F, i.e., the antenna device 3 is an inverse F-type antenna device protruding from the sidewall 10 of the frame 1.

Referring again to FIGS. 3 and 4, the antenna device 3 is made of metal or conductive material, having a first portion 310, a second portion 320, a third portion 330, a fourth portion 340 and a fifth portion 350. In this embodiment, the antenna device 3 is formed in a single element, and the first portion 310, the second portion 320, the third portion 330, the fourth portion 340 and the fifth portion 350 are connected to each other.

The second portion 320 is connected to one end of the first portion 310 to form an L-shaped structure of the antenna device 3, one end of the third portion 330 is connected to one side of the first portion 310 to form a T-shaped structure of the antenna device 3, and the first portion 310, the second portion 320 and the third portion 330 together form a similar F-shaped structure of the antenna device 3.

The fourth portion 340 and the fifth portion 350 are respectively connected to the first portion 310 and the third portion 330. The fourth portion 340 is connected is to another end of the first portion 310, and the fifth portion 350 is connected to another end of the third portion 330. The antenna device 3 is connected to the first reference electric potential EP1 and the second reference electric potential EP2 by the fifth portion 350 and the fourth portion 340, respectively, and an adjustable distance L is formed between the fifth portion 350 and the fourth portion 340.

In the present embodiment, the antenna device 3 is connected to the frame 1 through the fourth portion 340 disposed on the plate 4. Also, the antenna device 3 can be directly connected to the frame 1 if the frame 1 is directly made of metal or other conductive materials, without the help of the plate 4.

In FIG. 3, θ is an angle formed between the first portion 310 and the second portion 320. When transmitting the electromagnetic wave, the geometric shape of the angle θ formed by the first portion 310 and the second portion 320 can function as a capacitor or provide capacitor effect. Thus, the first portion 310 is a main body of the antenna device 3, and the second portion 320 is a frequency-adjustable portion of the antenna device 3. Central frequency of the common antenna At is adjusted by the first portion 310 and the second portion 320, i.e., and adjustment of the shape of the second portion 320 of the antenna device 3 changes central frequency of the common antenna At. In other words, central frequency of the antenna device 3 is adjusted by changing the length of the first portion 310 in direction X, and characteristic impedance of the antenna device 3 is adjusted by changing the length of the first portion 310 in direction Z.

In FIG. 4, the fifth portion 350 is connected to one side of the first portion 310 through the third portion 330, and the fifth portion 350 is also connected to the second conductive portion 51 of the cable 5, such that the signal is transmitted by the fifth portion 350. The fourth portion 340 is connected to the first portion 310, and the fourth portion 340 is also connected to the first conductive portion 50 of the cable 5 through the plate 4 disposed on the sidewall 10 of the frame 1, such that the antenna device 3 is grounded. Thus, the fourth portion 340 is an antenna-grounded portion of the antenna device 3, and the fifth portion 350 is a signal-transmission portion of the antenna device 3.

Impedance matching of the common antenna At can be adjusted by adjusting the distance L formed between the fifth portion 350 and the fourth portion 340, such that transmission power of the common antenna At is increased to a maximum and reflecting signal of the common antenna At is reduced to a minimum. That is to say, return loss of the common antenna At can be adjusted by the antenna device 3.

In FIG. 5, when transmitting signal by the portable wireless apparatus E, the signal processed by the modulator 61 of the adjustable device 6 is transmitted through the common antenna At (the antenna device 3 and the frame 1). On the other hand, the signal received by the common antenna At is processed by the demodulator 62 of the adjustable device 6.

TABLE 1

(unit:dBi)

| Plane Location | Relative coordinate point Frequency (GHz) | P1 2.40 | P2 2.45 | P3 2.50 |
|---|---|---|---|---|
| XY plane | Peak Gain | −0.62 | −0.96 | −0.55 |
| | Average Gain | −3.47 | −3.83 | −3.76 |
| YZ plane | Peak Gain | 0.77 | 0.47 | −0.41 |
| | Average Gain | −2.36 | −2.54 | −3.43 |
| XZ plane | Peak Gain | 2.54 | 2.06 | 2.85 |
| | Average Gain | −3.01 | −2.96 | −2.12 |

Figure 6:
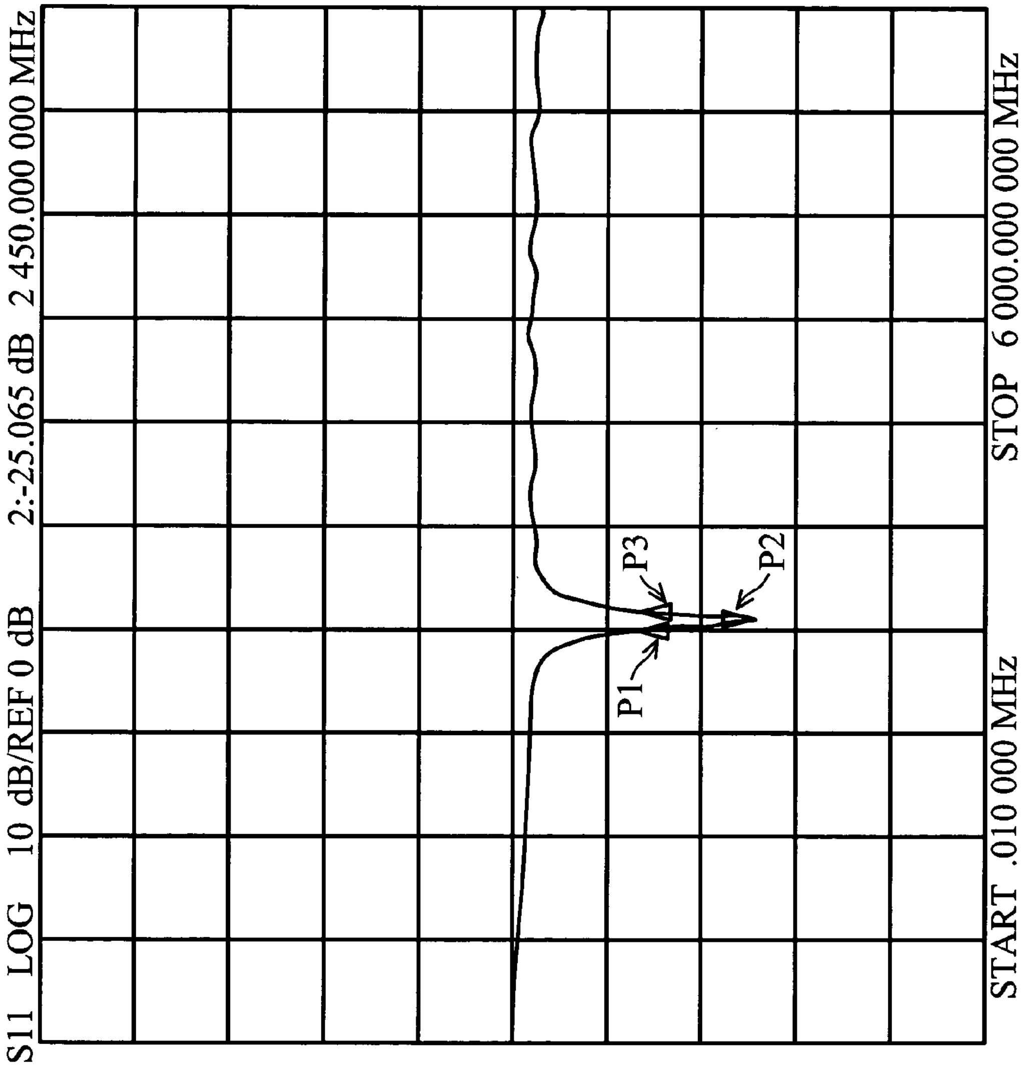
FIG. 6 is a chart of return loss measured from an inner common antenna (At) of the portable wireless apparatus (E).

The results of peak gain and average gain of three point P1, P2, P3 in FIG. 6 on three reference planes XY, YZ, XZ are shown in Table 1. It is to be understood that gain on each reference planes YZ, XZ, has a better effect than on the reference plane XY of the common antenna At, i.e., the effective area of the common antenna At is expanded and extended to more regions on each plane.

In FIG. 6, data of point P2 is −25.065 dB, where the common antenna At is operated at 2.45 GHz, and thus its return loss is 25.065 dB, data of point P1 is −14.097 dB, where the common antenna At is operated at 2.40 GHz, and thus its return loss is 14.097 dB, data of point P3 is −14.396 dB, where the common antenna At is operated at 2.50 GHz, and thus its return loss is 14.396 dB. Based on the data on points P1, P2 and P3, it is to be understood that performance of the common antenna At of the portable wireless apparatus E is superior to a normal antenna in a communication apparatus with single frequency or dual frequency mode, thus the utility of the portable wireless apparatus E is demonstrated.

The portable wireless apparatus E of the invention not only provides the inverse F-type antenna device 3, but also combines the frame 1 and the plate 4 with the antenna device 3 to form the common antenna At of the portable wireless apparatus E, i.e., the antenna system is adequately provided and embedded in the portable wireless apparatus E. The performance of the electromagnetic wave is increased to a maximum by properly adjusting the lengths of the first portion 310, the second portion 320, the third portion 330, the fourth portion 340 and the fifth portion 350 of the antenna device 3. Thus, resonance characteristics or mechanism of the antenna device 3 is reduced.

While this invention has been described in connection with what is presently considered to be the most practical and preferred embodiment, it is to be understood that the invention is not limited to the disclosed embodiments, but, on the contrary, is intended to enclose various modifications and equivalent arrangements included within the spirit and scope of the appended claims.

What is claimed is:

1. A portable wireless apparatus provided with a first reference electric potential and a second reference electric potential for transmitting at least one signal, comprising:

a housing;

a frame disposed on the housing; and an antenna device provided with central frequency and return loss and electronically connected to the frame, wherein the antenna device comprises a first portion, a second portion connected to the first portion for adjusting the central frequency, a third portion connected to the first portion, a fourth portion connected to the first portion and the frame and the second reference electric potential, and a fifth portion connected to the third portion and the first reference electric potential to provide an adjustable distance between the fifth portion and the fourth portion and adjusting return loss.

2. The portable wireless apparatus as claimed in claim 1, wherein the antenna device is an inverse F-type antenna device.

3. The portable wireless apparatus as claimed in claim 2, wherein the antenna device is a cantilever element protruding from the frame.

4. The portable wireless apparatus as claimed in claim 1 further comprising a plate disposed on the frame and electrically connected to the antenna device.

5. The portable wireless apparatus as claimed in claim 4, wherein the third portion is connected to the plate and the second reference electric potential.

6. The portable wireless apparatus as claimed in claim 1 further comprising a cable provided with a first conductive portion connected to the fourth portion for connecting the antenna device to the second reference electric potential and a second conductive portion electrically isolated from the first conductive portion and connected to the fifth portion for connecting the antenna device to the first reference electric potential.

7. The portable wireless apparatus as claimed in claim 1 further comprising an adjustable device connected to the antenna device, wherein the signal is transmitted between the adjustable device and the antenna device.

8. The portable wireless apparatus as claimed in claim 7, wherein the adjustable device has a modulator and a demodulator connected to the antenna device.

9. The portable wireless apparatus as claimed in claim 1, wherein the antenna device and the frame are made of conductive material.

10. The portable wireless apparatus as claimed in claim 1 further comprising a display unit disposed on the housing through the frame.

11. A portable wireless apparatus provided with a first reference electric potential and a second reference electric potential for transmitting at least one signal, comprising:

a housing;

is a frame disposed on the housing; and a display unit disposed on the housing through the frame;

an antenna device for transmitting the signal and electrically connected to the frame, provided with a frequency-adjustable portion for adjusting the central frequency and a signal-transmission portion which transmits the signal and is connected to the first reference electric potential, and an antenna-grounded portion connected to the frame and the first reference electric potential to provide an adjustable distance between the signal-transmission portion and the antenna-grounded portion for adjusting return loss.

12. The portable wireless apparatus as claimed in claim 11, wherein the antenna device is an inverse F-type antenna device.

13. The portable wireless apparatus as claimed in claim 12, wherein the antenna device is a cantilever element protruding from the frame.

14. The portable wireless apparatus as claimed in claim 11 further comprising a plate disposed on the frame and electrically connected to the antenna device.

15. The portable wireless apparatus as claimed in claim 14, wherein the antenna-grounded portion is connected to the plate and the second reference electric potential.

16. The portable wireless apparatus as claimed in claim 11 further comprising a cable provided with a first conductive portion connected to the antenna-grounded portion for connecting the antenna device to the second reference electric potential and a second conductive portion electrically isolated from the first conductive portion and connected to the signal-transmission portion for connecting the antenna device to the first reference electric potential.

17. The portable wireless apparatus as claimed in claim 11 further comprising an adjustable device connected to the antenna device, wherein the signal is transmitted between the adjustable device and the antenna device.

18. The portable wireless apparatus as claimed in claim 17, wherein the adjustable device has a modulator and a demodulator connected to the antenna device.

19. The portable wireless apparatus as claimed in claim 11, wherein the antenna device and the frame are made of conductive material.

20. The portable wireless apparatus as claimed in claim 11, wherein the display unit is a liquid crystal display.

* * * * *